United States Patent
Kato et al.

(10) Patent No.: US 6,921,604 B2
(45) Date of Patent: Jul. 26, 2005

(54) DEVICE AND METHOD FOR EVALUATING PERFORMANCE OF FUEL CELLS, DEVICE AND METHOD FOR EVALUATING SPECIFIC SURFACE AREA OF FUEL-CELL ELECTRODE CATALYSTS, FUEL-CELL ELECTRODE CATALYST, AND METHOD OF MANUFACTURING THE SAME

(75) Inventors: Hisao Kato, Nisshin (JP); Tatsuya Kawahara, Toyota (JP); Toshiaki Ozaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/778,105

(22) Filed: Feb. 17, 2004

(65) Prior Publication Data

US 2004/0161850 A1 Aug. 19, 2004

Related U.S. Application Data

(62) Division of application No. 09/773,544, filed on Feb. 2, 2001, now Pat. No. 6,713,020.

(30) Foreign Application Priority Data

Feb. 2, 2000 (JP) ........................ 2000-024632

(51) Int. Cl.$^7$ .................... H01M 4/86; H01M 4/90; H01M 4/96; H01M 8/00; H01M 6/00

(52) U.S. Cl. .................... 429/40; 429/12; 429/15; 429/29; 429/30; 429/33; 429/34; 429/35; 429/41; 429/44; 429/45; 429/46; 429/96; 429/99; 204/193; 204/194; 502/100; 502/101; 502/185; 502/221; 502/222; 502/223; 29/623.1

(58) Field of Search .................... 29/623.1; 429/12, 429/15, 29, 30, 33, 34, 35, 40, 41, 44, 45, 46, 96, 99; 204/193, 194; 502/100, 101, 185, 221, 222, 223

(56) References Cited

U.S. PATENT DOCUMENTS

| | | | | |
|---|---|---|---|---|
| 4,876,115 A | * | 10/1989 | Raistrick | 427/115 |
| 5,170,124 A | | 12/1992 | Blair et al. | 324/434 |
| 5,601,938 A | * | 2/1997 | Mayer et al. | 429/40 |
| 5,866,423 A | | 2/1999 | Sugawara et al. | 436/5 |
| 5,922,488 A | * | 7/1999 | Marucchi-Soos et al. | 429/44 |
| 5,945,229 A | | 8/1999 | Meltser | 429/13 |
| 6,063,516 A | | 5/2000 | Grot et al. | 429/22 |
| 6,106,965 A | * | 8/2000 | Hirano et al. | 429/30 |
| 6,171,992 B1 | | 1/2001 | Autenrieth et al. | 502/55 |
| 6,187,468 B1 | * | 2/2001 | Shinkai et al. | 429/42 |
| 6,242,260 B1 | | 6/2001 | Sugawara et al. | 436/5 |
| 6,329,092 B1 | * | 12/2001 | Maeda et al. | 429/23 |
| 6,790,554 B2 | * | 9/2004 | May et al. | 429/34 |

FOREIGN PATENT DOCUMENTS

| | | |
|---|---|---|
| JP | 61-197034 | 9/1986 |
| JP | 62-168545 | 7/1987 |
| JP | 05-047389 | 2/1993 |
| JP | 05-129023 | 5/1993 |
| JP | 05-217586 | 8/1993 |
| JP | 06-029028 | 2/1994 |
| JP | 06-052862 | 2/1994 |
| JP | 07-220741 | 8/1995 |
| JP | 08-022827 | 1/1996 |
| JP | 08-117598 | 5/1996 |
| JP | 09-027327 | 1/1998 |

* cited by examiner

*Primary Examiner*—Jill Warden
*Assistant Examiner*—Brian J. Sines
(74) *Attorney, Agent, or Firm*—Kenyon & Kenyon

(57) ABSTRACT

A device and a method for simply and accurately evaluating-performance of fuel cells have been provided. Hydrogen gas and carbon monoxide gas are caused to flow into a sample holder where an electrode catalyst sample is laid, and the amount of carbon monoxide gas discharged therefrom is detected. The amount of carbon monoxide gas adsorbed by the electrode catalyst sample is calculated based on the amount of supplied carbon monoxide gas and the amount of detected carbon monoxide gas. The output voltage of a fuel cell is calculated based on a correlation between calculated amounts of carbon monoxide gas adsorbed by the electrode catalyst and output voltages of the fuel cell.

5 Claims, 6 Drawing Sheets

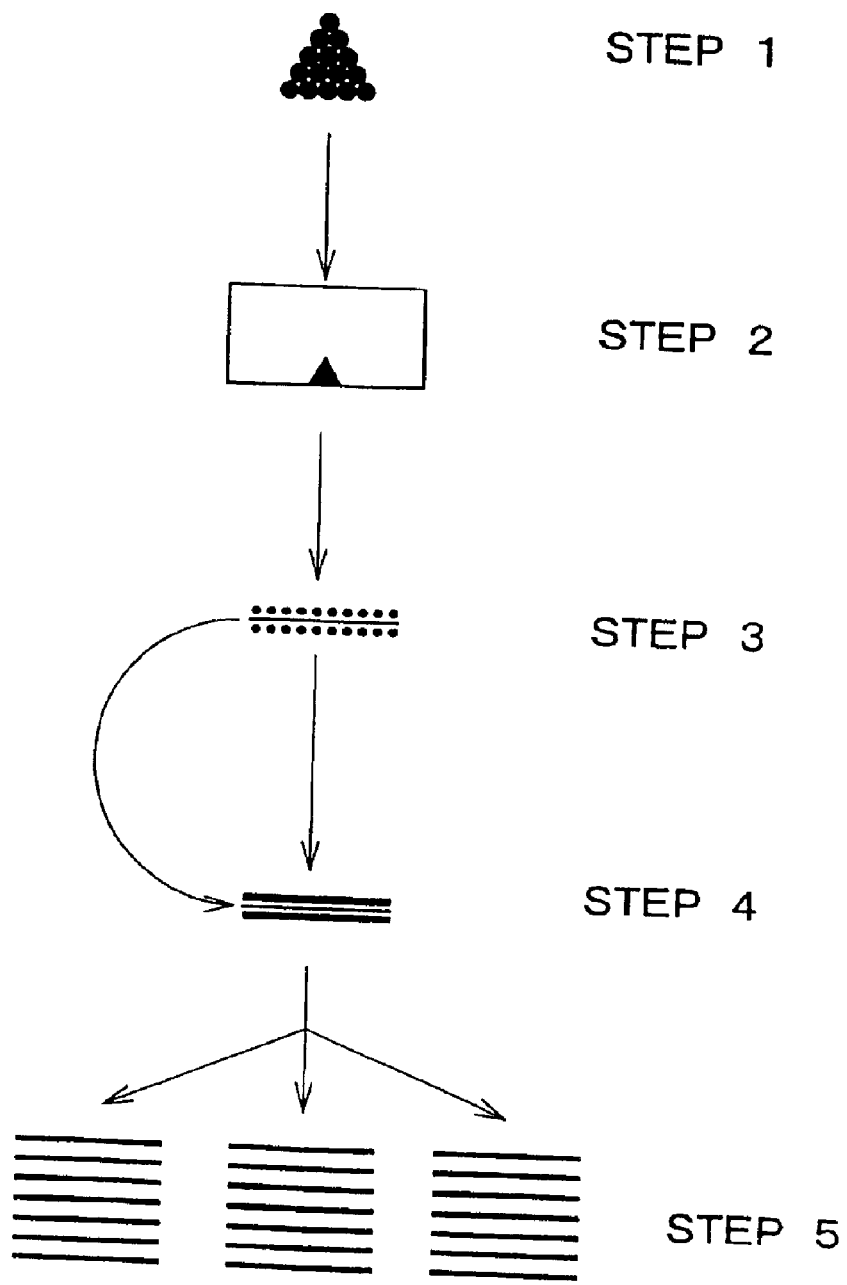

DEVICE AND METHOD FOR EVALUATING PERFORMANCE OF FUEL CELLS, DEVICE AND METHOD FOR EVALUATING SPECIFIC SURFACE AREA OF FUEL-CELL ELECTRODE CATALYSTS, FUEL-CELL ELECTRODE CATALYST, AND METHOD OF MANUFACTURING THE SAME

This is a division of application Ser. No. 09/773,544 filed 02 Feb. 2001 now U.S. Pat. No. 6,713,020 the content of which is incorporated herein by reference.

INCORPORATION BY REFERENCE

The disclosure of Japanese Patent Application No. 2000-024632 filed on Feb. 2, 2000 including the specification, drawings and abstract is incorporated herein by reference in its entirety.

BACKGROUND OF THE INVENTION

1. Field of the Invention

The invention relates to an art for evaluating the specific surface area of electrode catalysts fixed to fuel cell electrodes, an art for evaluating performance of fuel cells, an electrode catalyst evaluated according to the arts, and a fuel cell having the electrode catalyst.

2. Description of Related Art

The performance of electrode catalysts is one of the factors crucial for the performance of fuel cells, and a number of arts for evaluating performance of electrode catalysts have been suggested. For example, there is known a process wherein a fuel cell is formed and then discharged for measurement of its output voltage or a cyclic voltammetry process (CV process) wherein an electrode catalyst is soaked in an electrolytic solution and the voltage is swept for measurement of current. Both of these processes electrochemically perform evaluation by supplying electricity to electrode catalysts.

A fuel cell, which has been studied and developed earnestly in recent years, is a stack of a plurality of unit cells. The unit cell is formed by having a membrane-electrode assembly (MEA) sandwiched between separators. In general, if a fuel cell as a stack of unit cells is expected to demonstrate desired performance, each of MEA's is required to have performance exceeding a desired level. Accordingly, if an electrode catalyst is to be evaluated after formation of a fuel cell, it is necessary to evaluate MEA's individually. Because the output current from the respective MEA's is negligible, the necessity to pay close attention to adhesion of metal ions makes the process of measurement troublesome. Furthermore, the evaluation of an electrode catalyst is possible only after formation of MEA's, which require troublesome work when being formed and can be adjusted in quest of desired characteristics only with great difficulty.

In general, an electrode catalyst for fuel cells, which has a noble metal such as platinum carried on a carbon carrier, is fixed onto an electrolytic membrane together with an electrolyte binder, thus forming an MEA. The carbon carrier generally has a particle size of 20 nm to 100 nm and is characterized in that carbon atoms (primary particles) securely adhere to one another to form a secondary particle (agglomerate). Platinum has a particle size of about 2 nm to 3 nm. On the other hand, since the particle size of the electrolytic binder is larger than the distance between the primary particles, the electrolytic binder cannot enter gaps between the primary particles. Consequently, part of the platinum cannot contribute to chemical reaction. According to the CV process wherein an electrode catalyst is soaked in an electrolytic solution for measurement, the particle size of the electrolytic solution used herein is smaller than the distance between primary particles, and the electrolytic solution also comes into contact with platinum that is out of contact with an electrolytic binder (platinum that is irrelevant to catalytic reaction). Accordingly, the performance of the electrode catalyst is evaluated, taking into account the platinum that is irrelevant to the reaction. As a result, it is difficult to evaluate performance of electrode catalysts (performance of fuel cells) with sufficient accuracy.

SUMMARY OF THE INVENTION

The invention has been made to solve the aforementioned problems. It is an object of the invention to simply and accurately evaluate performance of fuel cells. It is also an object of the invention to simply and accurately evaluate the specific surface area of electrode catalysts. Furthermore, it is an object of the invention to provide a high-performance electrode catalyst and a high-performance fuel cell by using the arts for evaluation. It is also an object of the invention to simply and accurately evaluate performance of gaseous-reaction electrodes.

To solve the aforementioned problems, in a first aspect of the invention, there is provided a device for evaluating performance of fuel cells. The device includes a container that holds an electrode catalyst used in a fuel cell, a supplier that supplies a predetermined amount of carbon monoxide to the container, and a detector that detects an amount of carbon monoxide discharged from the container. The amount of carbon monoxide adsorbed by the electrode catalyst is determined based on the amount of carbon monoxide supplied by the supplier and the amount of carbon monoxide detected by the detector. The output voltage of the fuel cell is calculated based on the determined adsorption amount.

According to the aforementioned aspect, it is possible to simply and accurately evaluate performance of electrodes based on the adsorption amount of carbon monoxide.

In another aspect of the invention, there is provided a device for evaluating specific surface area of electrode catalysts for fuel cells. The device includes a container that holds an electrode catalyst used in a fuel cell, a reducing agent supplier that supplies a reducing agent, which reduces the electrode catalyst within an operating temperature range of the fuel cell, to the container, a carbon monoxide supplier that supplies a predetermined amount of carbon monoxide to the container after reduction has been carried out by the reducing agent, and a detector that detects an amount of carbon monoxide discharged from the container. The amount of carbon monoxide adsorbed by the electrode catalyst is determined based on the amount of carbon monoxide supplied by the supplier and the amount of carbon monoxide detected by the detector. The specific surface area of the electrode catalyst is calculated based on the determined adsorption amount.

According to this aspect, the reducing agent supplier can prevent the phenomenon of sintering from occurring in the electrode catalyst. Also, the specific surface area of electrode catalysts for fuel cells can be measured easily and precisely based on the adsorption amount of carbon monoxide.

In still another aspect of the invention, there is provided a method for evaluating performance of fuel cells. The method includes the steps of supplying carbon monoxide to a container holding an electrode catalyst used in a fuel cell and determining an amount of carbon monoxide adsorbed by the electrode catalyst. The output voltage of the fuel cell is calculated based on the calculated adsorption amount.

According to the aforementioned aspect, since the output voltage of the fuel cell is calculated based on the adsorption amount of carbon monoxide, it is possible to simply and accurately evaluate performance of the fuel cell.

In still another aspect of the invention, there is provided a method for evaluating specific surface area of electrode catalysts for fuel cells. The method includes the steps of supplying hydrogen gas to a container holding an electrode catalyst used in a fuel cell and reducing the electrode catalyst within an operating temperature range of the fuel cell by means of the hydrogen gas. After the reduction has been completed, carbon monoxide is supplied to the container. Then, the amount of carbon monoxide adsorbed by the electrode catalyst is determined, and the specific surface area of the electrode catalyst is calculated based on the determined adsorption amount.

According to this embodiment, the phenomenon of sintering can be prevented from occurring in the electrode catalyst through reduction thereof. Also, since the specific surface area of the electrode catalyst is determined from the adsorption amount of carbon monoxide, the specific surface area of the electrode catalyst can be evaluated simply and accurately.

In still another aspect of the invention, there is provided a method for manufacturing electrode catalysts for fuel cells. The method includes the steps of preparing a carbon carrier having a specific surface area of 1000 $m^2/g$ or more and having platinum carried on the carbon carrier with a predetermined platinum-carrying density.

The performance of the electrode catalyst is enhanced as its specific surface area increases. The performance converges if the specific surface area of the carbon carrier reaches 1000 $m^2/g$ or more. Therefore, the aforementioned aspect makes it possible to manufacture high-performance electrode catalysts for fuel cells.

BRIEF DESCRIPTION OF THE DRAWINGS

FIG. 8 is an image chart of the respective manufacturing processes shown in FIG. 7.

DETAILED DESCRIPTION

Hereinafter, a device for evaluating fuel cells according to an embodiment of the invention will be described with reference to the drawings. The device for evaluating fuel cells according to the invention evaluates performance of an electrode catalyst employed in a fuel cell (i.e. an electrode catalyst for a unit cell) and thereby evaluates performance of the fuel cell.

Figure 1:
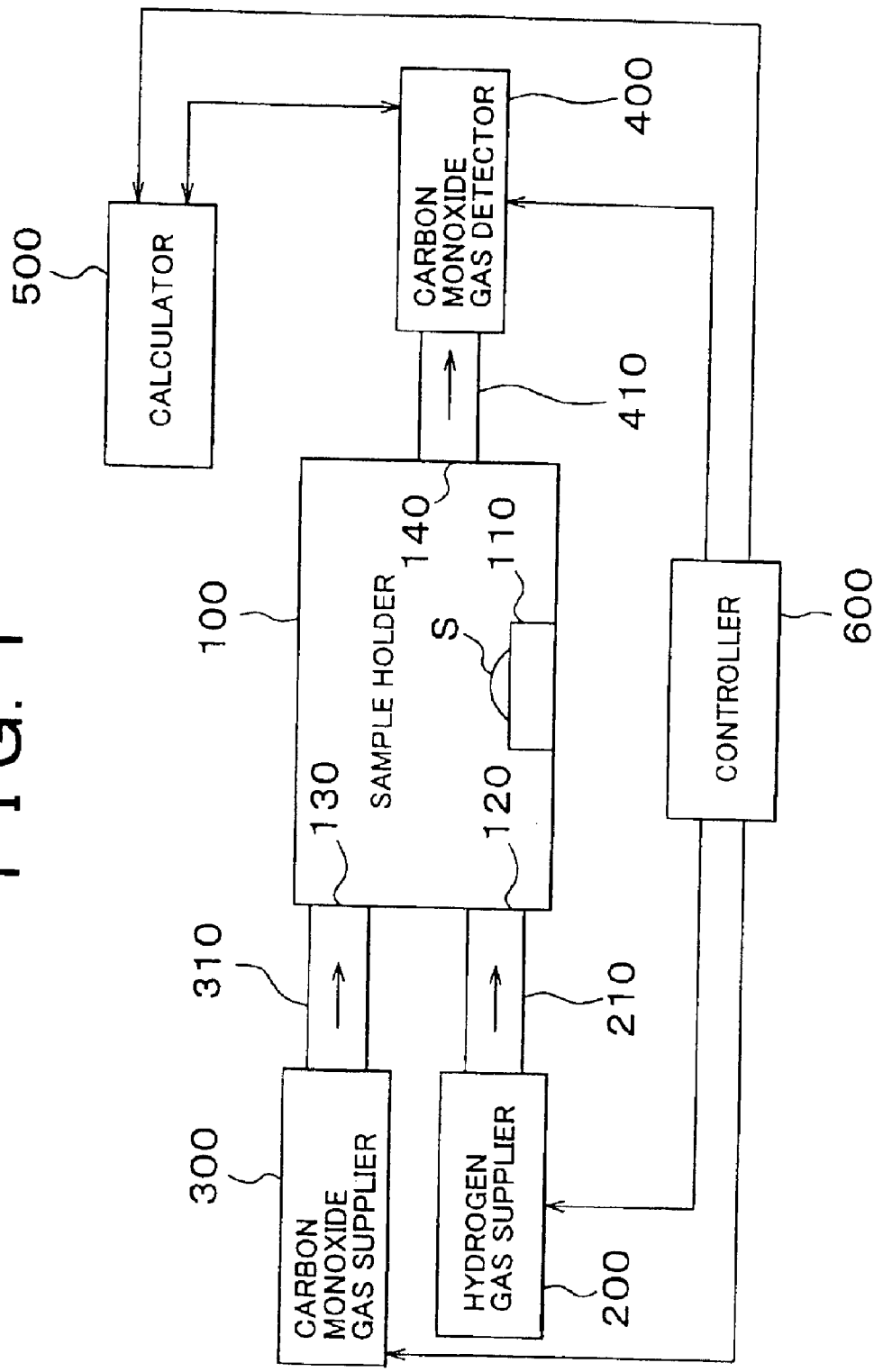
FIG. 1 is a schematic view of the structure of a device for evaluating fuel cells according to a first embodiment of the invention.

FIG. 1 schematically shows the structure of "a device for evaluating fuel cells" according to a first embodiment of the invention.

The device for evaluating fuel cells has a sample holder 100, a hydrogen gas supplier 200, a carbon monoxide gas supplier 300, a carbon monoxide gas detector 400, a calculator 500 and a controller 600. The sample holder 100 holds an electrode catalyst fixed to an electrolytic membrane as a sample. The hydrogen gas supplier 200 supplies hydrogen gas to the sample holder 100. The carbon monoxide gas supplier 300 supplies carbon monoxide gas to the sample holder 100. The carbon monoxide gas detector 400 detects carbon monoxide gas discharged from the sample holder 100. The calculator 500 calculates performance of a fuel cell (a specific surface area of the electrode catalyst) based on acquired data. The controller 600 controls the hydrogen gas supplier 200, the carbon monoxide gas supplier 300, the carbon monoxide gas detector 400 and the calculator 500.

The sample holder 100 has a sample base 110 on which an electrode catalyst sample S is laid, a hydrogen gas introduction port 120, a carbon monoxide gas introduction port 130 and a carbon monoxide gas discharge port 140. In order to prevent undesirable flow of hydrogen gas and carbon monoxide gas into the sample holder 100 or undesirable flow of carbon monoxide gas from the sample holder 100, valve mechanisms (not shown) are disposed in the introduction ports 120, 130 and the discharge port 140. The hydrogen gas that has been introduced into the sample holder 100 is discharged into the atmosphere from a discharge port (not shown).

The hydrogen gas supplier 200 communicates with the hydrogen gas introduction port 120 through a hydrogen gas supply line 210 for supplying hydrogen gas to the sample holder 100. The hydrogen gas supplier 200 supplies hydrogen gas to reduce the electrode catalyst sample S and performs pretreatment of evaluation of the fuel cell performance. Although not shown, the hydrogen gas supplier 200 is provided with a heater for overheating hydrogen gas, a supply pump for supplying hydrogen gas, and the like. The temperature of the hydrogen gas thus supplied is a temperature during operation of the fuel cell, that is, a temperature ranging from 60° C. to 150° C. This temperature preferably ranges from 60° C. to 90° C. and, more preferably, is equal to 80° C.

The carbon monoxide gas supplier 300 is coupled to the carbon monoxide gas introduction port 130 through a carbon monoxide gas supply line 310 for supplying carbon monoxide gas to the sample holder 100. Although not shown, the carbon monoxide gas supplier 300 is provided with a heater for overheating carbon monoxide gas, a supply pump for supplying carbon monoxide gas, and the like. The carbon monoxide gas supplier 300 supplies a predetermined mass of carbon monoxide gas at 80° C. in a pulse-like manner.

The carbon monoxide gas that has not been adsorbed in the sample holder 100 is discharged from the carbon monoxide gas discharge port 140 and introduced into the carbon monoxide gas detector 400 through a carbon monoxide gas introduction line 410. The carbon monoxide gas detector 400 is provided with a sensor for detecting the amount of carbon monoxide gas in the introduced carbon monoxide gas, a suction pump for promoting introduction of carbon monoxide gas, and the like.

The calculator 500 is connected to the carbon monoxide gas detector 400 and calculates the adsorption amount (Ncc/g–Pt) of the carbon monoxide gas adsorbed in the electrode catalyst sample S from the difference between the whole amount of carbon monoxide gas supplied to the sample holder 100 and the amount of carbon monoxide gas detected by the carbon monoxide gas detector 400. The adsorption amount of carbon monoxide gas calculated herein is the adsorption amount (cc) per unit mass of platinum in its standard state. The calculator 500 calculates the specific surface area of the electrode catalyst or the IR correction voltage from the calculated adsorption amount of carbon monoxide gas. The IR correction voltage is the output voltage of the fuel cell as a result of correction of its internal resistance.

According to a predetermined sequence, the controller 600 commands the hydrogen gas supplier 200 to supply hydrogen gas and commands the carbon monoxide gas supplier 300 to supply carbon monoxide gas. The controller 600 retrieves the amount of carbon monoxide gas detected by the carbon monoxide gas detector 400 and causes the calculator 500 to calculate the amount of carbon monoxide gas adsorbed in the electrode catalyst sample S. The predetermined sequence and the detailed contents of control will be described in conjunction with an evaluation procedure using the device of the invention.

Then, a procedure of evaluating electrode catalysts by means of the aforementioned device for evaluating fuel cells will be described.

Figure 2:
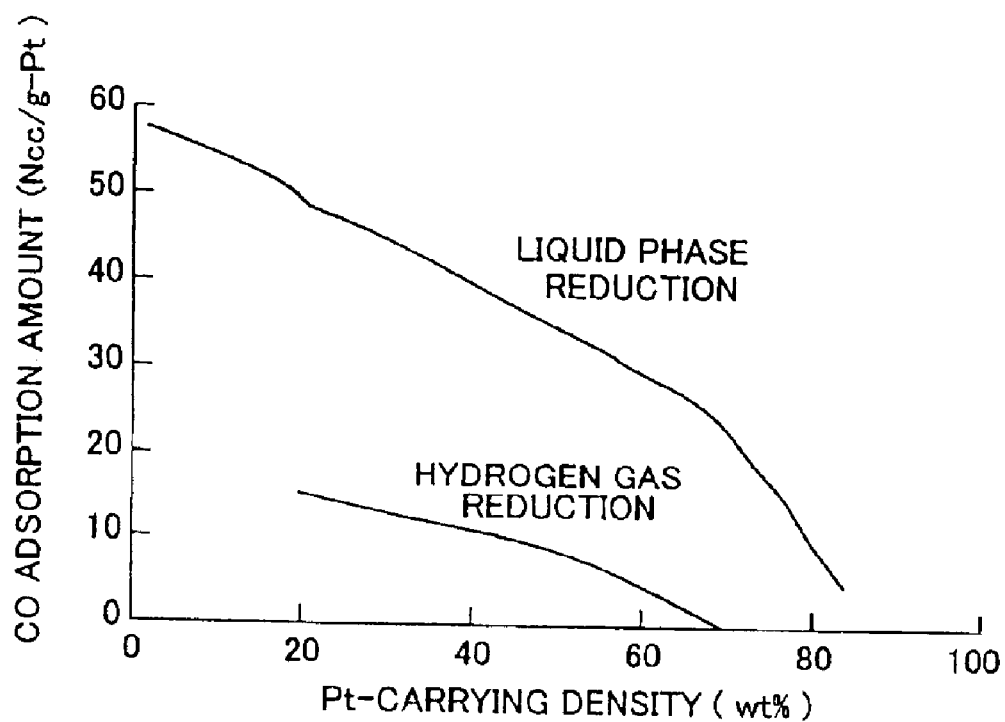
FIG. 2 is a graph showing a relation between adsorption amounts of carbon monoxide gas and platinum-carrying densities in a hydrogen gas reduction process and a liquid phase reduction process.

About 0.06 g of the electrode catalyst sample S fixed onto the electrolytic membrane is weighed and laid on the sample base 110. The electrode catalyst used herein is a catalyst wherein carbon serves as a carrier for carrying a predetermined amount of platinum Pt. In adjusting this electrode catalyst, a liquid phase reduction process using $NaBH_4$ (sodium tetrahydroborate) has been adopted instead of a hydrogen gas reduction process according to the related art. In the liquid phase reduction process, an electrode catalyst that has been produced by having platinum carried on a carbon carrier is immediately thrown into distilled water without being dried, made into aqueous solution of 1 wt % (weight %), and stirred by a stirrer for about 30 minutes. Then, a mol equivalent amount of the platinum carried on the electrode catalyst or more of $NaBH_4$ (2 wt % aqueous solution) is prepared, thrown into the aqueous solution of 1 wt %, and stirred for about 30 minutes. That is, since a process of reduction treatment can be started immediately after the electrode catalyst has been produced, and since the electrode catalyst is soaked in the liquid phase and reduced, the reduction treatment can be carried out satisfactorily in comparison with the hydrogen gas reduction process wherein hydrogen gas is passed onto the electrode catalyst. As a reducing agent, it is possible to use formic acid, hydrazine and the like as well as $NaBH_4$. A state achieved by this reduction process will be described with reference to FIG. 2. FIG. 2 is a graph showing a relation between adsorption amounts of carbon monoxide gas and platinum-carrying densities in the hydrogen gas reduction process and the liquid phase reduction process.

As is apparent from FIG. 2, for any platinum-carrying density, the adsorption amount of carbon monoxide gas according to the liquid phase reduction process is above the adsorption amount of carbon monoxide gas according to the hydrogen gas reduction process. It is understood from FIG. 2 that the adsorption amount of carbon monoxide gas decreases as the platinum-carrying density increases and that the adsorption amount of carbon monoxide gas falls sharply if the platinum-carrying density exceeds 70 wt %. For this reason, it seems desirable to lower the platinum-carrying density. However, in terms of gaseous diffusion, a catalytic layer is desirably thinned. In order to thin the catalytic layer using a fixed amount of platinum, the platinum-carrying density needs to be heightened. Thus, it can be concluded that the optimal platinum-carrying density is 70 wt %. The platinum-carrying density used in the description does not refer to the density at the time when the carbon carrier is stocked with platinum but the density obtained as a result of platinum-carrying treatment.

After the electrode catalyst sample S adjusted according to the aforementioned method has been laid on the sample base 110, the hydrogen gas supplier 200 causes hydrogen gas at a temperature of 80° C. to flow into the sample holder 100 for 15 minutes. This operation, which is a pretreatment carried out prior to measurement, reduces an oxidized portion of the electrode catalyst sample S.

In general, in terms of reduction reaction, it is desirable that the reduction-state temperature be high. For example, in a test for evaluating an exhaust gas purification catalyst for adsorbing carbon monoxide gas in exhaust gas, treatments for oxidizing/reducing the sample are carried out in an environment at a temperature of about 400° C. using oxygen gas and hydrogen gas. However, according to this embodiment, with a view to preventing sintering, the electrode catalyst sample S is reduced using only hydrogen gas at a relatively low temperature (about 80° C.). The ground that the electrode catalyst is reduced sufficiently by using hydrogen gas at a temperature of 80° C. according to this embodiment will now be explained.

It is assumed that one carbon monoxide molecule is adsorbed by one platinum atom present on the surface of a platinum particle (an aggregate of platinum atoms). Then, the particle size (diameter) of the platinum particle is calculated from the adsorption amount (Ncc/g–Pt) of carbon monoxide molecules based on the following calculation method. As described already, the adsorption amount of the carbon monoxide molecules represents the adsorption amount per unit weight of platinum. Accordingly, if the adsorption amount of carbon monoxide molecules is obtained, the number of platinum atoms present on the surface of the platinum particle is calculated under the aforementioned assumption (that one carbon monoxide molecule is adsorbed by one platinum atom). The number of platinum atoms is multiplied by the surface area of a platinum atom, whereby it becomes possible to calculate the surface area (specific surface area) ($m^2/g$) per unit mass of platinum. If the specific surface area is divided by the density of platinum, the surface area ($m^2/cm^3$) per unit volume of platinum is obtained. If it is assumed that the platinum particle is spherical or cubical, the particle diameter can be calculated from the obtained surface area per unit volume of platinum. That is, in the case where the quantity of platinum atoms (the mass and the number of platinum atoms) remains unchanged, the diameter of the platinum particle must be small if a great number of platinum atoms are to be present on the surface of the platinum particle.

According to this calculation method, if the reduction process has been carried out insufficiently, it is impossible to ensure that all the platinum atoms present on the surface of the platinum particle are activated (contribute to the reaction). Therefore, the total amount of adsorbed carbon monoxide molecules decreases, and the number of platinum atoms is estimated to be smaller than it is. (Although a certain number of platinum atoms are actually present on the surface of the platinum particle, they are inactive, do not contribute to the reaction, and hence, remain unrecognized.) For this reason, the diameter of the platinum particle calculated from the adsorption amount of carbon monoxide molecules is estimated to be greater than the actual diameter of the platinum particle calculated, for example, through X-ray diffraction (XRD). On the other hand, if the reduction process has been carried out sufficiently, all the platinum atoms present on the surface of the platinum particle are activated, and the number of platinum atoms present on the surface of the platinum particle is estimated correctly. Thus, the diameter of the platinum particle calculated from the adsorption amount of carbon monoxide molecules substantially coincides with the actual diameter of the platinum particle calculated through X-ray diffraction. If the diameter of platinum particles is widely dispersed, that is, if platinum particles of an extremely great diameter exist, the particle diameter may not be measured exactly through X-ray diffraction. Therefore, as an additional procedure, the result of X-ray diffraction may be reviewed, for example, using a transmission electron microscope.

Figure 3:
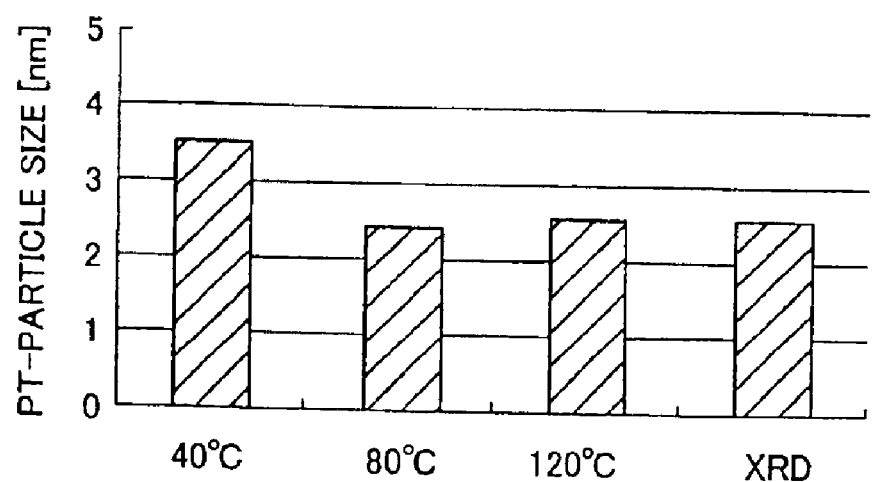
FIG. 3 is a graph showing a relation between adsorption amounts of carbon monoxide gas and temperatures for the reduction processes.

An experimental result of reduction treatment in a temperature range of 40° C. to 120° C. according to the aforementioned method will be described with reference to FIG. 3. FIG. 3 is a graph showing a relation between diameters of the platinum particle and temperatures for reduction treatment, along with the diameter of the platinum particle calculated through XRD as a comparison example. The relation between reduction temperatures and diameters of the platinum particle (the relation between reduction temperatures and adsorption amounts of carbon monoxide gas) in this experiment is as indicated by the graph. The diameter of the platinum particle is 3.5 nm, 2.5 nm and 2.6 nm at a reduction temperature of 40° C., 80° C. and 120° C. respectively. The diameter of the platinum particle calculated through XRD as the comparison example is 2.6 nm.

As can be understood from this experimental result, if the temperature for reduction treatment of the electrode catalyst is equal to or higher than 80° C., the diameter of the platinum particle to be obtained (about 2.5 nm to 2.6 nm) substantially coincides with the particle diameter calculated through XRD (2.6 nm). Accordingly, it can be concluded that the electrode catalyst can be reduced sufficiently by hydrogen gas at a temperature of 80° C.

The description of the evaluation procedure will now be resumed. After the reduction process using hydrogen gas has been completed, carbon monoxide gas of 100% is pulse-injected into the sample holder 100 through the carbon monoxide gas supplier 300. In this embodiment, the amount of carbon monoxide gas to be injected at a time is 1 cc, and pulse-injection is carried out six times. Accordingly, the calculator 500 calculates the amount of carbon monoxide gas adsorbed by the electrode catalyst sample S by subtracting the amount of carbon monoxide gas detected by the carbon monoxide gas detector 400 from the total amount of carbon monoxide gas injected into the sample holder 100 (6 cc).

Figure 4:
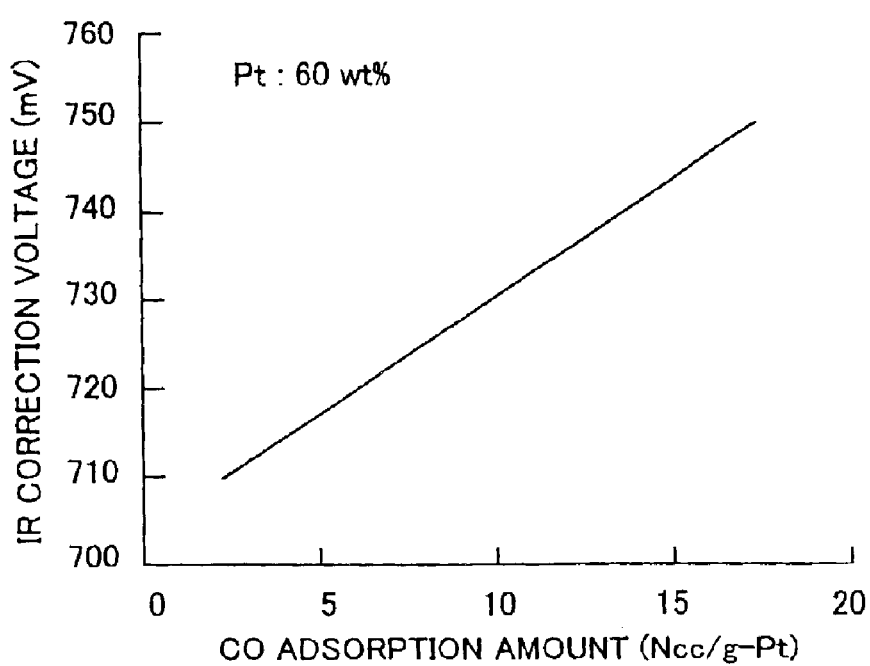
FIG. 4 is a graph showing a correlation between IR correction voltages and adsorption amounts of carbon monoxide gas.

Then, the calculator 500 calculates the IR correction voltage of the fuel cell from the calculated adsorption amount of carbon monoxide gas in the electrode catalyst, based on a correlation between adsorption amounts of carbon monoxide gas in the electrode catalyst and IR correction voltages of the fuel cell shown in FIG. 4. FIG. 4 is a graph showing a correlation between IR correction voltages (performance) of the fuel cell and adsorption amounts of carbon monoxide gas in the electrode catalyst. As is understood from FIG. 4, there is established a proportional relation between adsorption amounts of carbon monoxide gas in the electrode catalyst and IR correction voltages of the fuel cell. If the adsorption amount of carbon monoxide gas in the electrode catalyst increases, the IR correction voltage for the fuel cell also increases. Because the relation therebetween can be approximated to the relation of linear function, it is possible to obtain the IR correction voltage of the fuel cell by calculating the adsorption amount of carbon monoxide gas in the electrode catalyst.

The correlation between adsorption amounts of carbon monoxide gas and IR correction voltages of the fuel cell shown in FIG. 4 will now be described in detail. The correlation between adsorption amounts of carbon monoxide gas and IR correction voltages of the fuel cell cannot be established immediately, that is, can only be established through the specific surface area of the electrode catalyst, as will be described below.

Figure 5:
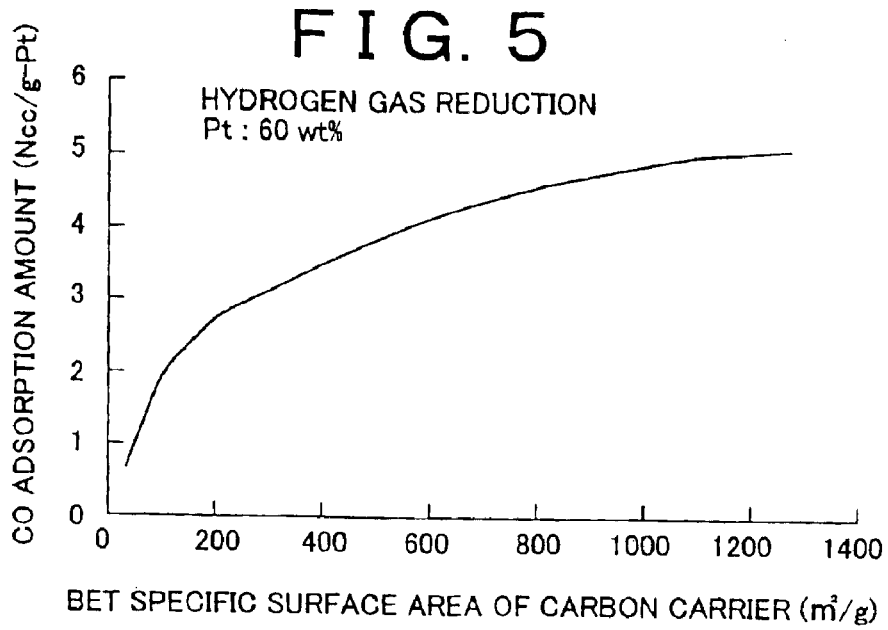
FIG. 5 is a graph showing a correlation between adsorption amounts of carbon monoxide gas and BET specific surface areas of a carbon carrier.

First of all, a relation between adsorption amounts of carbon monoxide gas in an electrode catalyst and specific surface areas of the electrode catalyst will be described with reference to FIG. 5. FIG. 5 is a graph showing a correlation between adsorption amounts of carbon monoxide gas in an electrode catalyst and BET specific surface areas of carbon carriers. The correlation shown in FIG. 5 demonstrates the result of a comparative experiment using eight carbon carriers shown in Table 1. The platinum-carrying density of the electrode catalyst is 60 wt %.

TABLE 1

| Carbon Carrier | BET Specific Surface Area ($m^2$/g) | CO Adsorption Amount (Ncc/g-Pt) | IR Correction Voltage (mV) |
|---|---|---|---|
| MONARCH 280 | 42 | 0.66 | 709 |
| ENSACO 250 POWDER | 62 | 1.3 | 715 |
| CD 2013 | 77 | 1.9 | 725 |
| BLACK PEARLS 460 | 84 | 1.6 | 723 |
| CDX 975 | 242 | 2.5 | 726 |
| VULCAN XC72R | 256 | 2.8 | 728 |
| PRINTEX XE2 | 1000 | 5 | 749 |
| KETJEN BLACK EC600JD | 1270 | 5.3 | 750 |

As is understood from FIG. 5, the BET specific surface area of the carbon carrier is proportional to the adsorption amount of carbon monoxide gas. Therefore, it is possible to calculate the BET specific surface area of the carbon carrier from the measured adsorption amount of carbon monoxide gas in the electrode catalyst, based on functionalization of the correlation curve shown in FIG. 5 or the graph shown in FIG. 5. That is, the adsorption amount of carbon monoxide gas in the electrode catalyst sample is measured by means of the above-described evaluation device, whereby it becomes possible to evaluate the specific surface area of the electrode catalyst (the carbon carrier). In terms of the performance of the electrode catalyst, it is desirable that the adsorption amount of carbon monoxide gas be great. It can be read from the graph shown in FIG. 5 that the adsorption amount of carbon monoxide gas substantially converges if the BET specific surface area of the carbon carrier exceeds 1000 $m^2$/g. Accordingly, when manufacturing a fuel cell, it is preferable to use an electrode catalyst having a BET specific surface area of 1000 $m^2$/g or more.

Figure 6:
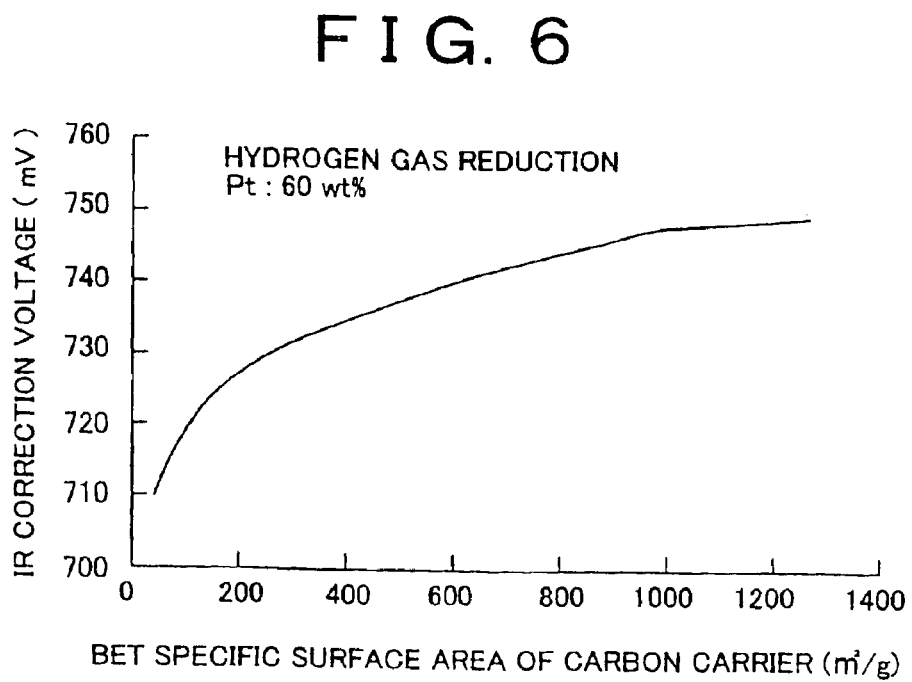
FIG. 6 is a graph showing a correlation between IR correction voltages of a fuel cell employing an electrode catalyst and BET specific surface areas of a carbon carrier.

A relation between output voltages of a fuel cell (unit cell, MEA) and specific surface areas of an electrode catalyst employed in the fuel cell will now be described with reference to FIG. 6. FIG. 6 is a graph showing a correlation between IR correction voltages and BET specific surface areas of a carbon carrier of an electrode catalyst. FIG. 6 is a graphic representation of the experimental result shown in Table 1. The IR correction voltage is an output voltage of the fuel cell after correction of its internal resistance.

The correlation shown in FIG. 6 represents the output voltage of the fuel cell measured in the case where a current density of 0.5 mA/cm$^2$ has been drawn from the MEA. According to this relation between IR correction voltages and BET specific surface areas of the carbon carrier, the BET specific surface area of the carbon carrier in the electrode catalyst is also proportional to the IR correction voltage of the fuel cell. It is possible to calculate the IR correction voltage of the fuel cell from the BET specific surface area of the carbon carrier in the electrode catalyst, through functionalization of the correlation shown in FIG. 6 or based on the graph shown in FIG. 6. That is, it is possible to evaluate performance of a fuel cell employing an electrode catalyst based on the specific surface area of the electrode catalyst sample. In terms of performance of the fuel cell, it is desirable that the IR correction voltage be large. It can be read from the graph shown in FIG. 6 that the IR correction voltage substantially converges if the BET specific surface area of the carbon carrier exceeds 1000 m$^2$/g. Accordingly, when manufacturing a fuel cell, it is preferable to use an electrode catalyst with a carbon carrier having a BET specific surface area of 1000 m$^2$/g or more.

It is understood from the graphs shown in FIGS. 5 and 6 that there is established a correlation between adsorption amounts of carbon monoxide gas in an electrode catalyst and IR correction voltages of a fuel cell, through the BET specific surface area of a carbon carrier in the electrode catalyst. By representing IR correction voltages of the fuel cell along the axis of ordinate and adsorption amounts of carbon monoxide gas in the electrode catalyst along the axis of abscissa, the correlation shown in FIG. 4 is obtained.

As described above, according to the first embodiment of the invention, powder of an electrode catalyst is used as a sample, whereby it becomes possible to evaluate a fuel cell employing the electrode catalyst. In performing evaluation, there is no need to fix the electrode catalyst to an electrolytic membrane or form a unit cell of the fuel cell. By merely measuring the adsorption amount of carbon monoxide gas in the electrode catalyst powder, it becomes possible to achieve the performance after formation of a unit cell or a fuel cell (module). Consequently, it becomes possible to dispense with the MEA-forming process including a process of fixing an electrode catalyst to an electrolytic membrane, which causes a problem in the measurement process according to the related art. Thus, the process of adjusting samples for measurement can be simplified significantly.

The specific surface area of an electrode catalyst and the performance of a fuel cell having an electrode catalyst can be evaluated based on the adsorption amount of carbon monoxide gas in the electrode catalyst. The method of evaluation according to this embodiment is based on the adsorption amount of carbon monoxide gas, unlike an electrochemical method wherein measurement is carried out by supplying electricity to an electrode catalyst. Thus, the method of this embodiment is advantageous in that the time required for measurement can be reduced and that the procedure of measurement is substantially simplified in itself.

Furthermore, unlike the CV process which is an electrochemical method of evaluation, since the method of evaluation according to the first embodiment of the invention is designed such that the performance of a fuel cell (electrode catalyst) is evaluated based on the adsorption amount of carbon monoxide gas, the performance of the fuel cell can be evaluated with greater accuracy.

That is, the sample to be tested need not be covered with an electrolyte to guarantee conductivity. The ratio of evaluating "catalysts that are irrelevant to the actual reaction" can be reduced substantially or nullified.

In this embodiment, an electrode catalyst is reduced at a low temperature, for example, of about 60° C. to 90° C. In general, since exhaust gas purification catalysts are used at a temperature of 400° C. or more, their catalytic function is optimized for the aforementioned temperature range. Also, since the density of platinum carried on an exhaust gas purification catalyst is no more than 3 wt % to 5 wt %, the phenomenon of sintering, namely, aggregation of fused platinum does not cause any serious problem. On the other hand, the operating temperature for fuel cells usually ranges from 60° C. to 90° C. An electrode catalyst is selected on the assumption that it will be used in an environment at the operating temperature. If an electrode catalyst having a noble metal such as platinum carried on carbon is reduced, for example, at a temperature above 200° C., carbon reacts with oxygen and produces carbon dioxide. Thus, the amount of carbon carrier decreases. Moreover, since the platinum-carrying density is high (40 wt % to 70 wt %), the phenomenon of sintering, which reduces the specific surface area of the electrode catalyst and degrades its catalytic function, may occur easily. This phenomenon of sintering depends on heat and can occur even if the reaction has been carried out under a nitrogen atmosphere. On the other hand, according to this embodiment, since the electrode catalyst is reduced at a low temperature (e.g. about 60° C. to 90° C.), it is possible to prevent a decrease of the amount of carbon carrier in the electrode catalyst or the phenomenon of sintering.

In the aforementioned first embodiment of the invention, the device for evaluating performance of fuel cells has been described. However, the invention can also be applied to a device for evaluating the specific surface area of electrode catalysts. In obtaining the specific surface area of an electrode catalyst, the calculator 500 can calculate the specific surface area of the electrode catalyst from the adsorption amount of carbon monoxide gas, based on the correlation between adsorption amounts of carbon monoxide gas in the electrode catalyst and specific surface areas of the electrode catalyst as shown in FIG. 5. In general, as is understood from the graph shown in FIG. 6, the performance of the fuel cell tends to be enhanced with increases of the specific surface area of the electrode catalyst. Thus, when roughly screening electrode catalysts, their specific surface areas may be calculated using the calculator 500.

Figure 7:
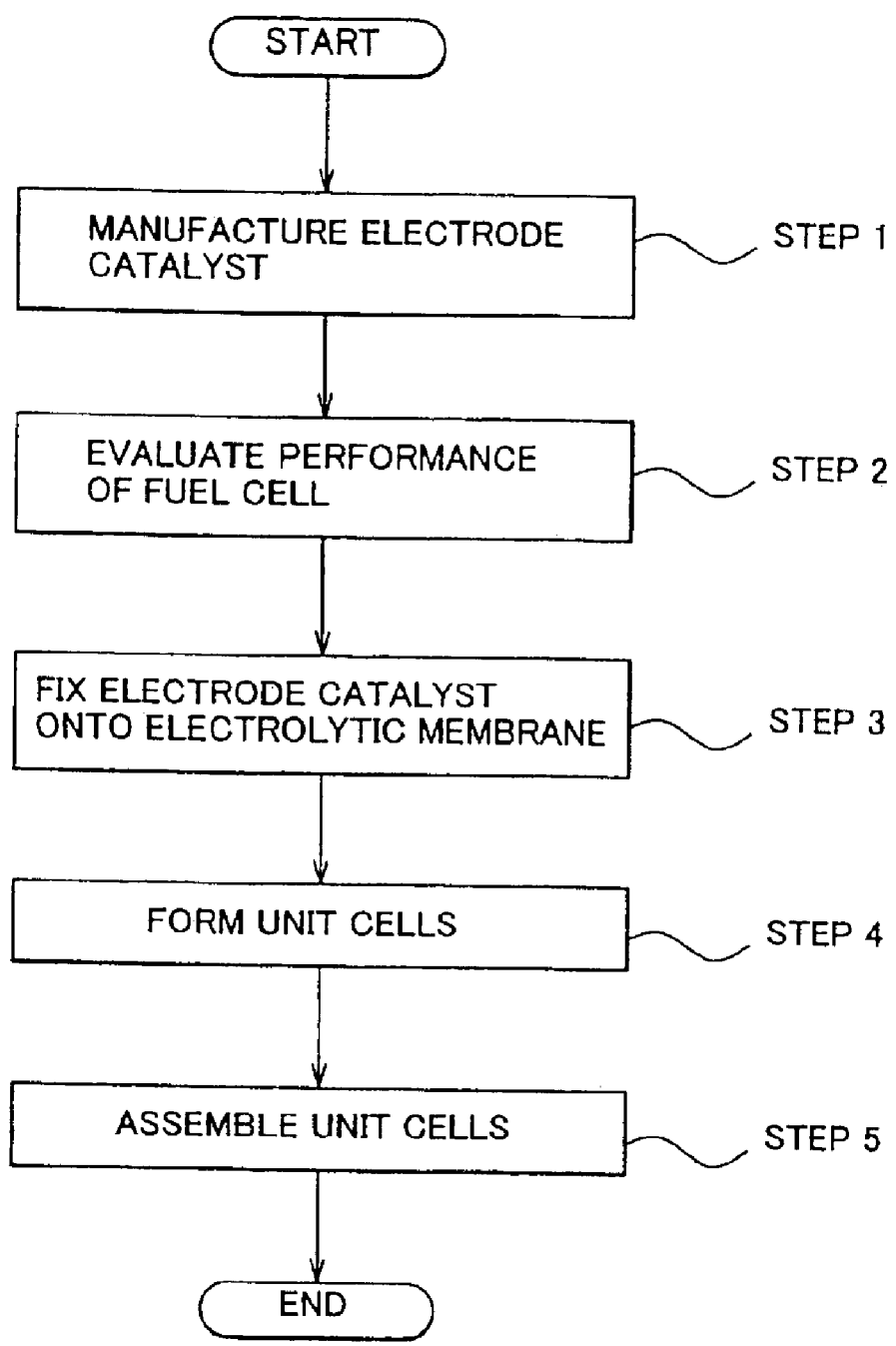
FIG. 7 is a flow chart showing manufacturing processes of a fuel cell.

In the aforementioned first embodiment, the description has been made on the assumption that performance of fuel cells is evaluated mainly at an experimental level. However, the invention is not limited to the device and method for evaluating fuel cells at an experimental level but can also be applied to one of processes of manufacturing fuel cells, for example, as shown in FIGS. 7 and 8. FIG. 7 is a flow chart showing manufacturing processes of a fuel cell. FIG. 8 is an image chart of the respective manufacturing processes shown in FIG. 7. First of all, an electrode catalyst is manufactured according to the aforementioned method or the like (STEP 1). The manufactured electrode catalyst is partially or entirely evaluated according to the aforementioned device and method for evaluating performance of fuel cells, whereby the performance of a fuel cell employing the evaluated electrode catalyst is evaluated (STEP 2). Then, the evaluated electrode catalyst or a group of electrode catalysts is dissolved in a solid polymer electrolyte and an organic alcohol solvent and stirred, and the ink-like electrode catalyst thus obtained is applied to an electrolytic membrane and fixed thereto (which is known as Decal process) (STEP 3). "A membrane-electrode assembly (MEA)" obtained by fixing the electrode catalyst to the electrolytic membrane is combined with separators to form a unit cell (STEP 4). Finally, a desired number of the unit cells thus formed are stacked on one another, and current collecting plates are disposed at opposed ends of the stacked unit cells, which are then assembled into a fuel cell (STEP 5).

Because the process of evaluating performance of fuel cells according to the invention does not include electrochemical measurement, it is simple and requires a short period of time. In addition, the performance of fuel cells can be evaluated using an electrode catalyst, without forming unit cells. Therefore, if the process of evaluating electrode catalysts according to the invention has been incorporated into the processes of manufacturing fuel cells, it becomes possible to manufacture fuel cells (unit cells) capable of achieving desired performance.

All the fuel cells (unit cells) manufactured according to such manufacturing processes may have an electrode catalyst having desired performance, for example, an electrode catalyst wherein platinum is carried on a carbon carrier having a specific surface area of 1000 $m^2/g$ or more with a platinum-carrying density of 70 wt %. Accordingly, it is possible to narrow down individual differences among the unit cells and manufacture high-performance unit cells. By providing unit cells which have high-performance electrodes and are not appreciably different from one another, it becomes possible to manufacture high-performance fuel cells whose characteristics do not substantially disperse among the respective unit cells.

In the aforementioned embodiment, an electrode catalyst is used as a sample before being fixed to an electrolytic membrane. However, an electrode catalyst fixed to an electrolytic membrane (MEA) may be used as a sample. In this case, a desired amount of the electrode catalyst must be fixed to the electrolytic membrane. However, it is possible to evaluate the specific surface area of electrode catalysts and the performance of fuel cells according to a mode where the electrode catalysts are actually used.

In the structure of the device shown in FIG. 1, hydrogen gas and carbon monoxide gas may be supplied to the sample holder 100 through a single supply line and recovered from the sample holder 100 through a single recovery line. The calculator 500 may be integrated with the controller 600.

Moreover, although the invention has been applied to an electrode for fuel cells in the aforementioned embodiment, it is also applicable as a method for evaluating performance of gaseous-reaction electrodes. In other words, the invention is applicable to any electrode. That is, it is evident that the invention can be applied not only to an electrode for fuel cells but also to a general-purpose gaseous-reaction electrode that reacts with gas to cause electrostatic reaction.

Although the embodiment of the invention has been described, it is intended for better comprehension of the invention and does not impose any limitation on the invention. It is apparent that the invention may be changed and modified without departing the spirit thereof and that the invention includes its equivalences.

What is claimed is:

1. A method for manufacturing membrane-electrode assemblies, comprising:

forming an electrode catalyst by having platinum carried on a carbon carrier having a specific surface area of 1000 $m^2/g$ or more with a predetermined platinum-carrying density; and fixing the electrode catalyst onto an electrolytic membrane;

wherein the platinum-carrying density is 70 weight % after the carbon carrier has the platinum carried thereon.

2. A method for manufacturing unit cells constituting fuel cells, comprising:

forming an electrode catalyst by having platinum carried on a carbon carrier having a specific surface area of 1000 $m^2/g$ or more with a predetermined platinum-carrying density;

forming an electrode from the electrode catalyst; and assembling the electrode with an electrolytic membrane and separators;

wherein the platinum-carrying density is 70 weight % after the carbon carrier has the platinum carried thereon.

3. A membrane-electrode assembly for fuel cells, comprising:

an electrode catalyst composed of platinum carried on a carbon carrier having a specific surface area of 1000 $m^2/g$ or more with a predetermined platinum-carrying density; and an electrolytic membrane to which the electrode catalyst is fixed;

wherein the platinum-carrying density is 70 weight % after the carbon carrier has the platinum carried thereon.

4. A unit cell constituting a fuel cell, comprising:

electrodes having an electrode catalyst having platinum carried on a carbon carrier having a specific surface area of 1000 m2/g or more with a predetermined platinum-carrying density;

an electrolytic membrane whose front and back surfaces have the electrodes disposed thereon; and separators disposed on front and back sides of the electrolytic membrane;

wherein the platinum-carrying density is 70 weight % after the carbon carrier has the platinum carried thereon.

5. A fuel cell comprising:

electrodes having an electrode catalyst having platinum carried on a carbon carrier having a specific surface area of 1000 $m^2/g$ or more with a predetermined platinum-carrying density;

an electrolytic membrane whose front and back surfaces have the electrodes disposed thereon;

separators disposed on front and back sides of the electrolytic membrane;

a stack formed by stacking a plurality of the separators; and current collecting plates disposed at opposed ends of the stack;

wherein the platinum-carrying density is 70 weight % after the carbon carrier has the platinum carried thereon.

* * * * *